United States Patent [19]

Kato

[11] Patent Number: 5,249,131
[45] Date of Patent: Sep. 28, 1993

[54] APPARATUS FOR CONTROLLING THE LOADING OF WORKPIECES ONTO A PALLET

[75] Inventor: Hisao Kato, Inazawa, Japan

[73] Assignee: Mitsubishi Denki Kabushiki Kaisha, Tokyo, Japan

[21] Appl. No.: 599,125

[22] Filed: Oct. 17, 1990

[30] Foreign Application Priority Data

Oct. 23, 1989 [JP] Japan .................................. 1-275177

[51] Int. Cl.$^5$ .............................................. G06F 15/46
[52] U.S. Cl. ..................... 364/478; 358/101; 382/8
[58] Field of Search ............... 364/478, 479, 559, 555; 395/94; 382/8, 25, 48; 358/101, 107, 903

[56] References Cited

U.S. PATENT DOCUMENTS 4,305,130 12/1981 Kelley et al. .................... 364/478
4,608,646 8/1986 Goodrich et al. ................. 364/478
4,821,197 4/1989 Kenik et al. ..................... 364/478

FOREIGN PATENT DOCUMENTS 61-33426 7/1984 Japan .
61-238613 10/1986 Japan .
1-176604 of 1989 Japan .

Primary Examiner—Jerry Smith
Assistant Examiner—Thomas E. Brown
Attorney, Agent, or Firm—Leydig, Voit & Mayer

[57] ABSTRACT

A loading management apparatus for managing the loading of a plurality of types of workpieces onto a pallet is disclosed which is small in size, simple in structure and inexpensive to manufacture, and hence is particularly suitable for handling a relatively small number of workpieces. An operator can load a plurality of types of workpieces onto a pallet in a predetermined pattern with extreme ease in accordance with an imaged loading instruction which is displayed. The condition of the loaded workpieces is also displayed so that if there is an error or disagreement between the loading instruction and the condition of the loaded workpieces, the operator is immediately warned of such an error, thus enabling appropriate action to be taken for proper or correct loading.

1 Claim, 4 Drawing Sheets

5,249,131

APPARATUS FOR CONTROLLING THE LOADING OF WORKPIECES ONTO A PALLET

BACKGROUND OF THE INVENTION

The present invention relates to an apparatus for managing the loading onto a pallet of a plurality of types of workpieces.

An example of such an automatic loading management apparatus is disclosed in Japanese Patent Laid-Open No. 61-33426. The known automatic loading management apparatus prepares a plurality of types of workpiece loading patterns for the automatic loading of a plurality of types of workpieces.

However, this known automatic loading management apparatus is particularly intended to handle a multitude of workpieces and hence is too large in size and complicated in construction, so it is too expensive for small- or medium-scale loading operations.

SUMMARY OF THE INVENTION

Accordingly, the present invention is intended to obviate the above-described problems and has for its object the provision of a loading management apparatus which is small in size, simple in structure and inexpensive to manufacture, and hence is particularly suitable for handling a relatively small number of workpieces.

Another object of the present invention is to provide a loading management apparatus which is able to perform the loading of workpieces with a predetermined loading pattern in an efficient manner.

In order to achieve the above objects, according to the present invention, there is provided a loading management apparatus for managing the loading of a plurality of types of workpieces onto a pallet, the apparatus comprising:

instruction means for preparing a workpiece loading pattern based on given loading information and for providing a loading instruction in the form of a visual image based on the thus prepared workpiece loading pattern;

loading condition detecting means for detecting the condition of the workpieces which are loaded onto the pallet according to the loading instruction of the instruction means;

a control unit being operable to determine whether there is disagreement between the loading instruction of the instruction means and the loading condition of the workpieces detected by the loading condition detecting means; and warning means being operated by the control unit to provide a warning of disagreement when the control unit determines that there is disagreement between the loading instruction and the detected loading condition.

Preferably, the loading management apparatus further comprises display means for displaying the loading instruction of the instruction means so that an operator can load the workpieces onto the pallet while looking at the visual image of the loading instruction displayed at the display means.

The display means further operates to display the loading condition of the workpieces detected by the loading condition detecting means during the time the loading instruction is being provided by the instruction means.

With the loading management apparatus as constructed above, the operator can load the workpieces onto the pallet in a predetermined pattern with extreme ease in accordance with the imaged loading instruction of the instruction means, and the condition of the loaded workpieces is displayed at the display means. If there is an error or disagreement in loading, the operator is immediately warned of such an error so that he or she can take appropriate action for proper or correct loading.

The above and other objects, features and advantages of the present invention will become apparent from the following detailed description of a preferred embodiment of the invention taken in conjunction with the accompanying drawings.

DESCRIPTION OF THE PREFERRED EMBODIMENT

The present invention will now be described in detail with reference to a preferred embodiment thereof as illustrated in the accompanying drawings.

Figure 1:
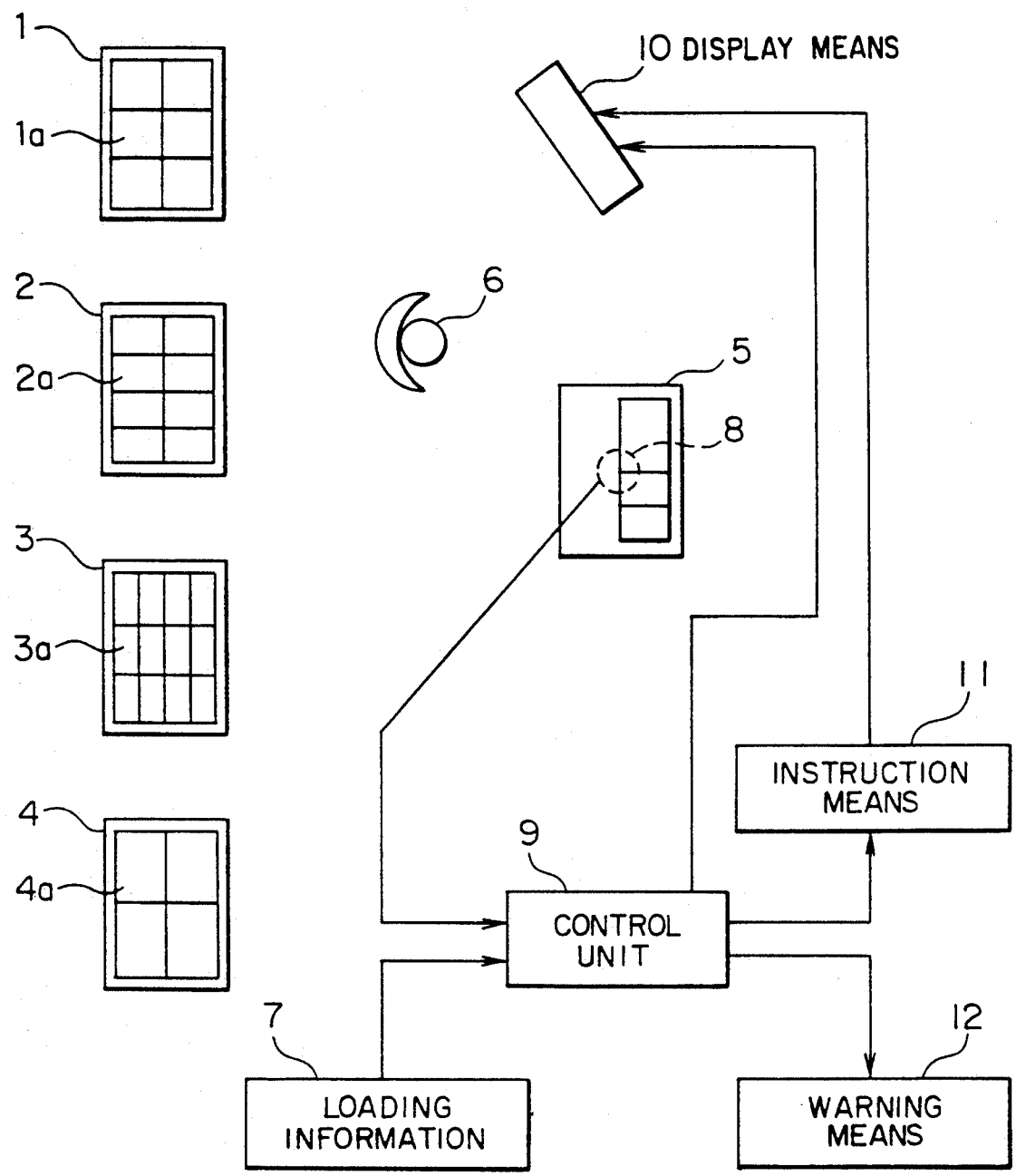
FIG. 1 is a plan view of the conceptional overall arrangement of an embodiment of a loading management apparatus in accordance with the present invention.
Figure 2:
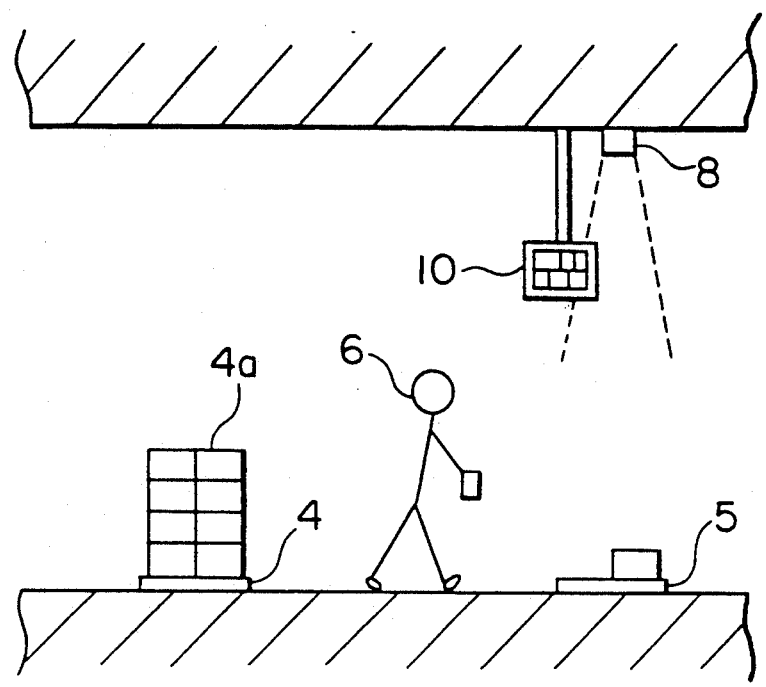
FIG. 2 is a plan view of the embodiment.
Figure 6:
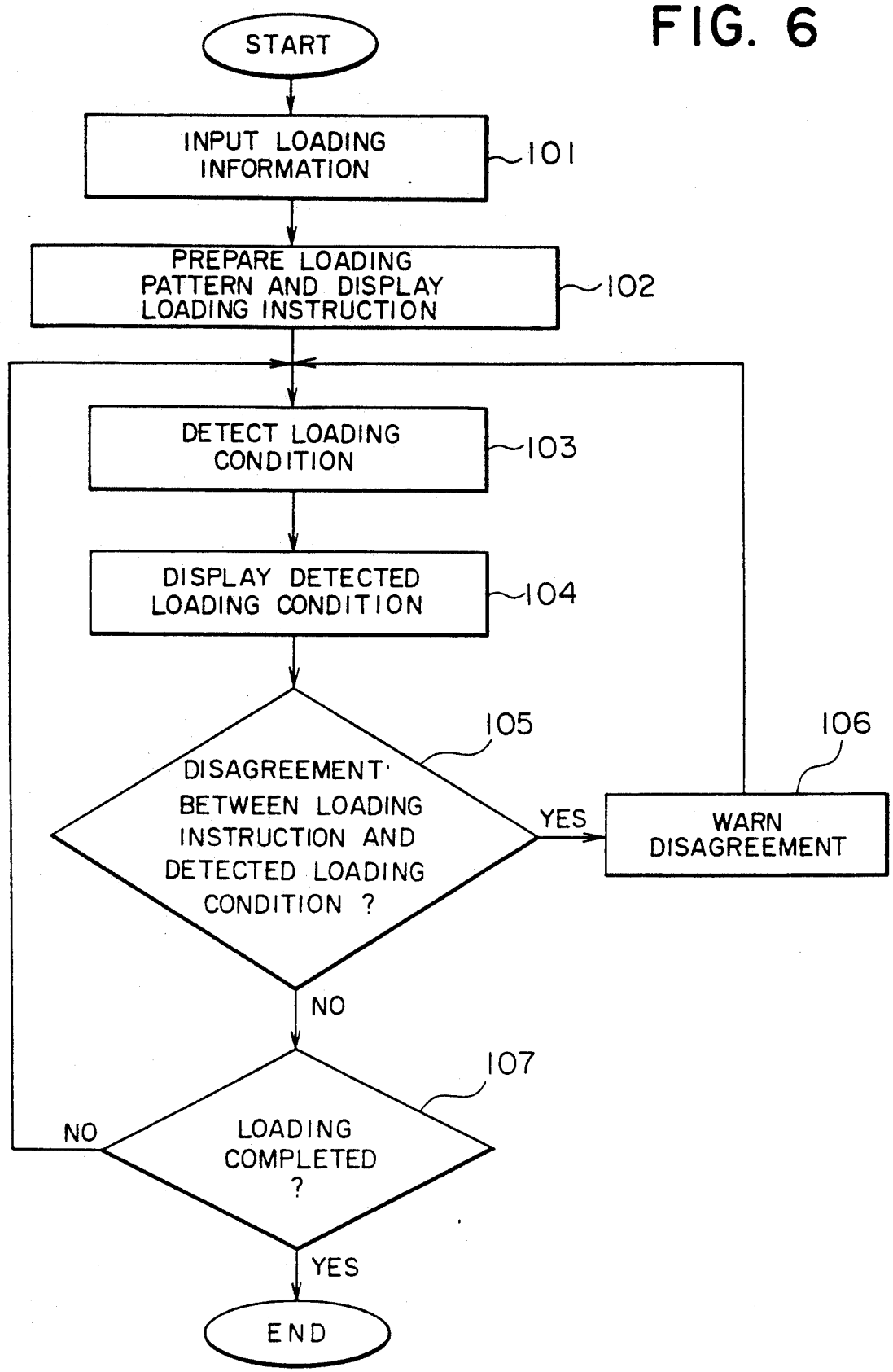
FIG. 6 is a flow chart showing the operation of the FIG. 1 embodiment.

Referring first to FIG. 1, a loading management apparatus according to the present invention includes a control unit 9 which stores a loading-pattern preparation program for preparing an appropriate loading pattern based on an input of loading information 7, and a disagreement detection program which will be described in detail later with reference to FIG. 6, a display means 10 for providing an operator 6 with a visual instruction for loading workpieces 1a through 4a onto a specific pallet 5, a loading condition detecting means 8 in the form of a vision sensor for detecting the condition of the workpieces loaded on the pallet 5, an instruction means 11 for inputting the detected condition of the loaded workpieces to the instruction display means 11, and a warning means 12 for generating a warning when a disagreement between the loading instruction display of the instruction means 10 and the detected condition of the loaded workpieces exists. The workpieces 1a through 4a are stored in appropriate locations 1 through 4 according to their type which is construed, in the present invention, as including kind, size, shape, weight, and the like. For example, as shown in FIG. 1, the workpieces 1a through 4a are stored in separate locations according to their size.

Figure 5:
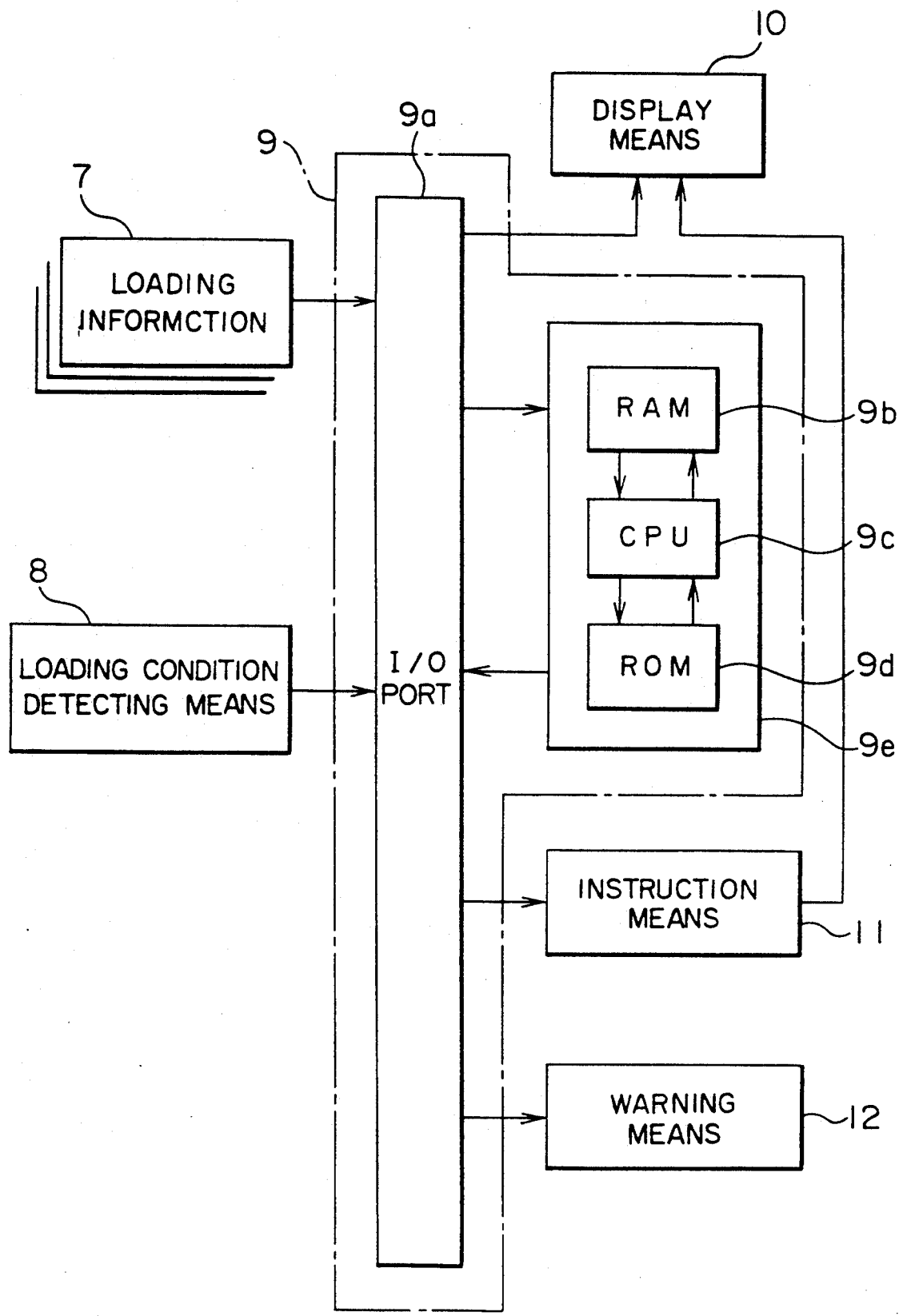
FIG. 5 is a conceptional circuit diagram of the FIG. 1 embodiment, showing somewhat concrete electrical connections between various component elements.

As shown in FIG. 5, the control unit 9 comprises an input/output (I/O) port 9a for receiving loading information 7 from the outside and the output signal of the loading condition detecting means 8 as well as for sending various instruction signals to the display means 10, the instruction means 11 and the warning means 12, and a microcomputer 9e including a random access memory (RAM) 9b for storing the loading-pattern preparation program, the disagreement detection program, temporary data and the like, a central processing unit (CPU)

9c, and a read only memory (ROM) 9d. The loading-pattern preparation program stored in the RAM 9b has no particular importance in the present invention and may be any kind of known program for preparing a loading pattern for loading workpieces onto a pallet.

The operation of the loading management apparatus as constructed above will now be described with reference to a flow chart of FIG. 6.

Figure 3:
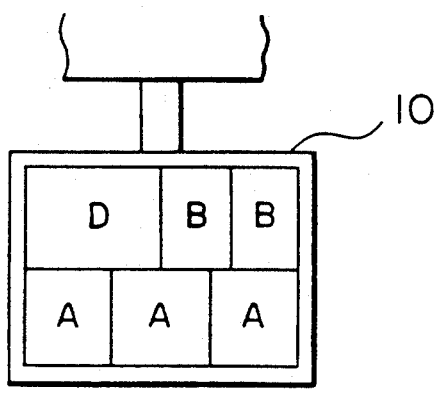
FIGS. 3 and 4 are front elevations, on an enlarged scale, of an instruction means of FIG. 1, respectively showing different operating states thereof.
Figure 4:
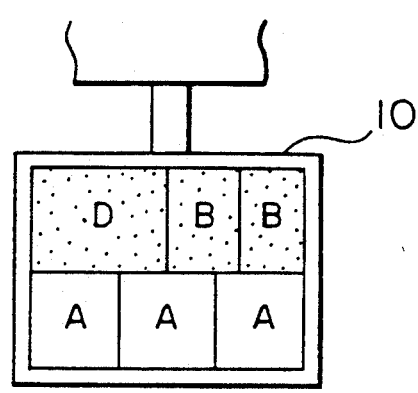

Specifically, a pallet 5 is first located in place, and loading information 7 is input to the control unit 9 which then generates a loading command in accordance with the loading information 7 in Step 101. Subsequently in Step 102, based on the loading command from the control unit 9, the instruction means 11 automatically prepares an appropriate loading pattern which is then sent to the display means 10 which displays a loading instruction in the form of a pattern image, as shown in FIG. 3. Looking at this loading instruction thus displayed, the operator 6 can readily load a required number of workpieces for each kind or size as instructed in a predetermined pattern without needing his or her own judgements on these matters. In the course of such loading operation, the loading condition of workpieces is detected by the loading condition detecting means 8 in Step 103, and then in Step 104, the detected loading condition is fed back to the control unit 9 and displayed in the form of a pattern image at the display means 10 through the action of the instruction means 11, as illustrated in FIG. 4, this pattern image being the same as that of FIG. 3 except for the color of the loaded workpieces being changed from that of the remaining unloaded ones. Subsequently in Step 105, it is determined whether there is disagreement between the loading instruction and the detected loading condition of the workpieces. If disagreement exists, the warning means 12 is actuated to warn the operator 6 of such disagreement in Step 106. With this warning, the operator (6) modifies his loading operation so as to eliminate the disagreement. During the course of modifying the loading operation, Steps 103 through 105 are again repeated. On the other hand, if there is no disagreement, the process proceeds to Step 107 where it is determined whether the loading onto the pallet 5 of the workpieces has been completed. If not, Steps 103 through 107 are repeated. In this manner, with the apparatus of a very simple construction, the operator 6 is able to readily load various kinds of workpieces onto the pallet 5.

Incidently, the operator 6 in the above embodiment may be an industrial robot for loading operation. In this case, when the warning means 12 is actuated to provide a warning, the operation of the robot can be stopped. In addition, if an abnormal situation takes place in which a workpiece slips off the gripping hands of the robot for example, the loading operation of the robot can be modified or replaced by a human operator with the substantially same results as obtainable with the embodiment of FIGS. 1 through 6. In this manner, improper loading, which could result from an abnormality in operation of the robot, can be avoided.

As described in the foregoing, according to the present invention, an operator is able to load onto a pallet a required number of workpieces for each type thereof in a predetermined pattern in accordance with the visible instructions displayed at the display means. Further, the loaded workpieces are also displayed at the display means so that if there is an error in loading, the operator is warned of such an error. Accordingly, with the apparatus of a simple construction, the operator is able to perform a loading operation with ease and efficiency, and improper loading can be avoided.

What is claimed is:

1. An interactive load management apparatus for managing the loading of a plurality of workpieces onto a pallet, said apparatus comprising:

a display device;

pattern instruction means for preparing a workpiece pattern instruction image, representing the contents of a workpiece load pattern, by specifying workpieces by kind, number of workpieces of each kind, and load order of the workpieces, and for generating a signal representing the instruction image;

pattern detecting means for detecting the pattern of workpieces loaded on the pallet, and for generating a signal representing the detected pattern;

interactive display control means, connected to said display device, connected to said pattern instruction means, and connected to said pattern detecting means, for first receiving the signal from said pattern instruction means and displaying the pattern instruction image on said display device, and for subsequently receiving the signal from said pattern detecting means and interactively modifying the displayed image to simultaneously display the pattern instruction image and the detected workpiece pattern; and pattern comparison means, connected to said pattern instruction means and said pattern detecting means, for detecting disagreement between the signal representing the pattern instruction image and the signal representing the detected loaded workpiece pattern.

* * * * *